United States Patent
Chikamoto et al.

(10) Patent No.: US 10,571,785 B2
(45) Date of Patent: Feb. 25, 2020

(54) LENS ALIGNMENT ADJUSTMENT DEVICE AND PROJECTOR EQUIPPED WITH THE SAME

(71) Applicants: THK CO., LTD., Tokyo (JP); SEIKO EPSON CORPORATION, Tokyo (JP)

(72) Inventors: Noriaki Chikamoto, Tokyo (JP); Hiroyuki Furui, Suwa (JP); Akira Nemura, Suwa (JP)

(73) Assignees: THK CO., LTD., Tokyo (JP); SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/070,942

(22) PCT Filed: Jan. 13, 2017

(86) PCT No.: PCT/JP2017/001004
§ 371 (c)(1),
(2) Date: Jul. 18, 2018

(87) PCT Pub. No.: WO2017/126426
PCT Pub. Date: Jul. 27, 2017

(65) Prior Publication Data
US 2019/0033696 A1   Jan. 31, 2019

(30) Foreign Application Priority Data
Jan. 20, 2016   (JP) .................. 2016-008586

(51) Int. Cl.
*G03B 21/14* (2006.01)
*G02B 7/02* (2006.01)
(Continued)

(52) U.S. Cl.
CPC ........... *G03B 21/142* (2013.01); *G02B 7/022* (2013.01); *G02B 7/023* (2013.01); *G02B 7/026* (2013.01);
(Continued)

(58) Field of Classification Search
CPC .... G02B 27/09; G02B 7/026; G02B 27/0955; G02B 7/022; G01B 7/02; G03B 21/00;
(Continued)

(56) References Cited

U.S. PATENT DOCUMENTS 5,764,312 A   6/1998 Okumura
2005/0270502 A1* 12/2005 Iinuma .................. H04N 9/317
353/101

(Continued)

FOREIGN PATENT DOCUMENTS

JP   8-195923 A   7/1996
JP   08195923 A * 7/1996
(Continued)

OTHER PUBLICATIONS

International Search Report dated Mar. 21, 2017, issued in counterpart International Application No. PCT/JP2017/001004 (2 pages).

*Primary Examiner* — Isiaka O Akanbi
*Assistant Examiner* — Danell L Owens
(74) *Attorney, Agent, or Firm* — Westerman, Hattori, Daniels & Adrian, LLP

(57) ABSTRACT

Provided is a lens alignment adjustment device capable of suitably correcting an angle accuracy of an optical axis of a lens unit with respect to a projector main body. A lens alignment adjustment device is provided to a projector to retain a projection lens, and is capable of adjusting inclination of an optical axis of the projection lens with respect to the projector. The lens alignment adjustment device includes: a base plate which is retained in a predetermined posture with respect to the projector; and a lens fixing plate to which the projection lens is fixed. The lens fixing plate is rockably coupled to the base plate through intermediation of a first center pin orthogonal to an optical axis of the projection lens. First adjusting means for setting an inclina-
(Continued)

tion angle of the lens fixing plate with respect to the base plate about the first center pin is provided.

10 Claims, 3 Drawing Sheets

(51) Int. Cl.
*H04N 9/31* (2006.01)
*G02B 27/09* (2006.01)

(52) U.S. Cl.
CPC ....... *G02B 27/0955* (2013.01); *H04N 9/3105* (2013.01); *H04N 9/317* (2013.01)

(58) Field of Classification Search
CPC ........ G03B 21/14; G03B 21/142; H04N 5/74; H04N 9/3105; H04N 9/317; G20B 7/023
USPC ....................................................... 353/101
See application file for complete search history.

(56) References Cited

U.S. PATENT DOCUMENTS

| | | | |
|---|---|---|---|
| 2006/0081745 A1 | 4/2006 | Theriault et al. | |
| 2009/0324292 A1 | 12/2009 | Oda | |
| 2014/0092371 A1* | 4/2014 | Nemura | G03B 21/142 |
| | | | 353/101 |

FOREIGN PATENT DOCUMENTS

| | | |
|---|---|---|
| JP | 9-163273 A | 6/1997 |
| JP | 2001-218102 A | 8/2001 |
| JP | 2004-4206 A | 1/2004 |
| JP | 2008-517348 A | 5/2008 |
| JP | 2008-292778 A | 12/2008 |
| JP | 2010-8761 A | 1/2010 |
| JP | 2010-276895 A | 12/2010 |
| JP | 2014-71195 A | 4/2014 |

* cited by examiner

LENS ALIGNMENT ADJUSTMENT DEVICE AND PROJECTOR EQUIPPED WITH THE SAME

TECHNICAL FIELD

The present invention relates to a lens alignment adjustment device which is configured to adjust inclination of a projection lens in a projector, and to a projector including the same.

BACKGROUND ART

In a projector, light emitted from an illumination optical system is modulated with use of a modulation optical system such as a digital micromirror device (DMD) or a liquid crystal panel, and the modulated light is enlarged and projected onto a screen provided outside the device with use of a projection lens. The projection lens may have a configuration of being removable from the projector including the illumination optical system and the modulation optical system. Through replacement of the projection lens, the projector is adaptable to a wide variety of projection distances which differ depending on use.

As a mechanism configured to mount the projection lens to the projector, there have been known mechanisms of, for example, a bayonet type and a spigot type. In any of those types, a flange portion provided on the lens unit side is pressed against a lens mount main body provided on the projector side so that the lens unit is retained in a certain posture with respect to the lens mount main body.

Moreover, in a lens mounting device disclosed in Patent Literature 1, an angle adjustment plate is provided to the lens mount main body, and the flange portion of the lens unit is brought into press contact with the angle adjustment plate. A plurality of angle adjustment screws are threadably engaged with the angle adjustment plate, and distal ends of the angle adjustment screws are held in abutment against the lens mount main body. Through changes in amount of thread engagement of each angle adjustment screw, the installation angle of the angle adjustment plate with respect to the lens mount main body can be changed. With this, the lens unit is retained on the projector in a posture with the angle adjustment plate as a reference, and an angle accuracy of an optical axis of the lens unit with respect to an optical axis of the projector can be suitably corrected.

CITATION LIST

Patent Literature

[PTL 1] JP 2010-276895 A

DISCLOSURE OF THE INVENTION

Problems to be Solved by the Invention

However, in the related-art lens mounting device disclosed in Patent Literature 1, when the amount of thread engagement of one angle adjustment screw among the plurality of angle adjustment screws is changed, inclination of the angle adjustment plate with respect to the lens mount main body is changed with another angle adjustment screws as support points. Thus, there has been a problem in that a distance between the lens unit and the lens mount main body on the optical axis is changed every time the amount of thread engagement of each angle adjustment screw is changed.

Means for Solving the Problems

The present invention has been made in view of the above-mentioned problem, and has an object to provide a lens alignment adjustment device capable of suitably correcting an angle accuracy of an optical axis of a lens unit with respect to an optical axis of a projector main body while always maintaining a constant distance between the lens unit and a projector on the optical axis.

That is, according to one embodiment of the present invention, there is provided a lens alignment adjustment device, which is provided to a projector to retain a projection lens, and is capable of adjusting inclination of an optical axis of the projection lens with respect to the projector, the lens alignment adjustment device including: a base plate which is retained in a predetermined posture with respect to the projector; and a lens fixing plate to which the projection lens is fixed, wherein the lens fixing plate is rockably coupled to the base plate through intermediation of a first restriction shaft orthogonal to an optical axis of the projection lens, and wherein first adjusting means for setting an inclination angle of the lens fixing plate with respect to the base plate about the first restriction shaft is provided.

Effects of the Invention

According to one embodiment of the present invention, it is possible to suitably correct the angle accuracy of the optical axis of the projection lens with respect to the optical axis of the projector while always maintaining the constant distance between the projection lens and the projector main body on the optical axis.

MODE FOR CARRYING OUT THE INVENTION

Now, with reference to the accompanying drawings, detailed description is made of a lens alignment adjustment device to which the present invention is applied.

Figure 1:
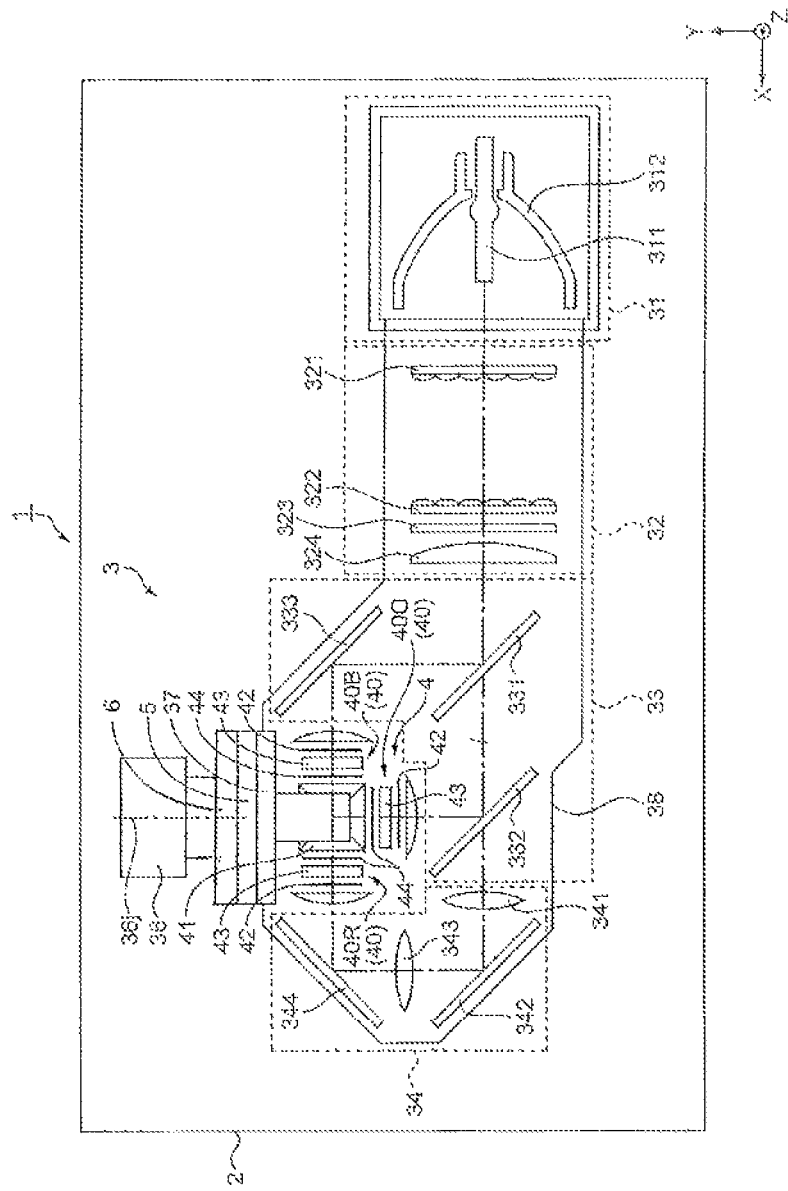
FIG. 1 is a schematic view for illustrating a schematic configuration of a projector.

FIG. 1 is a schematic view for illustrating a schematic configuration of a projector to which the lens alignment adjustment device according to one embodiment of the present invention is mounted. The projector modulates a light flux emitted from a light source based on image information, and then enlarges and projects the modulated light flux onto, for example, a screen.

As illustrated in FIG. 1, the projector 1 includes an exterior housing 2 forming an exterior, a controller (not shown), and an optical unit 3 including a light, source device 31. A projection lens 36 is fixed to the optical unit 3. Although illustration is omitted, for example, a power supply device configured to supply power to the light source device 31 or the controller and a cooling device configured to cool the optical unit 3 are further arranged inside the exterior housing 2.

The projector 1 according to this embodiment includes a lens shift adjustment device 5 configured to move the projection lens 36 and a lens alignment adjustment device 6 configured to correct an angle accuracy of an optical axis of the projection lens 36, and is capable of moving an image projected on, for example, a screen. In the following, for convenience of description, a direction in which the light flux is emitted from the projection lens 36 is referred to as "front side", and an upward direction under a state in which the projector 1 is in an installation posture of being installed on, for example, a desk is referred to as "upper side", The exterior housing 2 is made of synthetic resin, and is formed so that a distal end portion of the projection lens 36 is exposed. The exterior housing 2 has an air inlet for taking in outside air and an air outlet for discharging warm air inside the exterior housing 2 to the outside.

The controller includes, for example, a central processing unit (CPU), a read-only memory (ROM), and a random access memory (RAM). The controller functions as a computer, and is configured to control operations of the projector 1. For example, the controller performs control related to projection of an image.

Under control by the controller, the optical unit 3 optically processes the light flux emitted from the light source device 31, and projects the processed light flux. As illustrated in FIG. 1, in addition to the light source device 31, the optical unit 3 includes an integrator illumination optical system 32, a color separation optical system 33, a relay optical system 34, an optical device 4, a head body 37, a projection lens 36, a lens shift adjustment device 5, a lens alignment adjustment device 6, and an optical component housing 38 for arranging those members at predetermined positions on an optical path.

As illustrated in FIG. 1, the optical unit 3 has a substantially L-shape in plan view, and has one end portion to which the light source device 31 is removably mounted and another end portion at which the projection lens 36 is arranged. In the following, for convenience of description, a direction in which the light flux is emitted from the light source device 31 is referred to as "plus X direction". A direction in which light projected from the projector 1 is emitted is referred to as "plus Y direction" (forward direction). An upward direction is referred to as "plus Z direction". Moreover, a plus-and-minus X direction corresponds to a right-and-left direction, and a plus-and-minus X direction corresponds to an up-and-down direction.

The light source device 31 includes, for example, a light source 311 and a reflector 312. The light source 311 is of a discharge type, and is formed of, for example, an extra-high pressure mercury lamp or a metal halide lamp. A light flux emitted from the light source 311 is reflected on the reflector 312, and is emitted toward the integrator illumination optical system 32.

The integrator illumination optical system 32 includes a first lens array 321, a second lens array 322, a polarization conversion element 323, and a superimposing lens 324, and is configured so that the light flux emitted from the light source device 31 is substantially evenly radiated onto a surface of a liquid crystal light valve 43 described later or is effectively used.

The color separation optical system 33 includes two dichroic mirrors 331 and 332 and a reflection mirror 333, and has a function of separating the light flux emitted from the integrator illumination optical system 32 into three colored lights including reel light (hereinafter referred to as "R-light"), green light (hereinafter referred to as "G-light"), and blue light (hereinafter referred to as "B-light").

The relay optical system 34 includes an incident side lens 341, a relay lens 343, and reflection mirrors 342 and 344, and has a function of guiding the R-light separated in the color separation optical system 33 to the liquid crystal light valve 43 for the R-light. The optical unit 3 has the configuration in which the relay optical system 34 guides the R-light. However, a configuration of the optical unit 3 is not limited to this configuration. For example, the B-light may foe guided.

The optical device 4 includes electric optical devices 40 provided for respective colored lights (electric optical device 40R for R-light, electric optical device 40G for G-light, and electric optical device 40B for B-light) and a cross dichroic prism 41 being a color compositing optical device. The electric optical devices 40 each include an incident side polarizing plate 42, a liquid crystal light valve 43 being a light modulation device, and an emission-side polarizing plate 44, and are configured to modulate the respective colored lights based on image information.

The cross dichroic prism 41 is formed of four rectangular prisms bonded to one another and has substantially a square shape in plan view. On each surface of bonding the rectangular prisms to one another, two dielectric multilayer films are formed. The cross dichroic prism 41 reflects the dielectric multilayer films reflect colored lights modulated by the electric optical devices 40R and 40B, and causes colored light modulated by the electric optical device 40G to pass therethrough, to thereby combine the colored lights.

The projection lens 36 includes a plurality of lenses (not shown) arranged along an optical axis $36j$, and enlarges and projects the light combined by the cross dichroic prism 41 onto the screen. The head body 37 supports the lens shift adjustment device 5 with respect to the optical component housing 38, and the projection lens 36 retained by the lens shift adjustment device 5 is movable in the right-and-left direction and the up-and-down direction relative to the optical component housing 38.

The lens alignment adjustment device 6 includes a mount mechanism configured to mount the projection lens 36 to the optical unit 3. When an optical axis of the projection lens 36 mounted to the optical unit 3 has inclination with respect to an optical axis of the optical device 4 of the optical unit 3, the lens alignment adjustment device 6 is used to adjust the inclination. It is not always required that the lens alignment adjustment device 6 include the mount mechanism. The projection lens 36 may be fixedly provided to the lens alignment adjustment device 6.

The lens alignment adjustment device 6 includes a base plate and a lens fixing plate. The base plate is retained in a predetermined posture with respect to the optical unit 3. The lens fixing plate includes a mount mechanism to which the projection lens 36 is fixed. Moreover, the lens fixing plate is rockably coupled to the base plate through intermediation of a first restriction shaft. The first restriction shaft is orthogonal to the optical axis $36j$ of the projection lens 36 retained on the lens fixing plate. The term "orthogonal" represents a state in which, when a center axis for the first restriction shaft is imaginarily extended, the center axis perpendicularly intersects the optical axis. Moreover, this device includes first adjusting means for setting an inclination angle of the lens fixing plate about the first restriction shaft with respect to the base plate.

In such a device, the lens fixing plate is rockable about the first restriction shaft, and the inclination angle of the lens fixing plate with respect to the base plate can be freely changed about the first restriction shaft. Moreover, the inclination angle of the lens fixing plate with respect to the base plate can be set by the first adjusting means.

In this case, the first restriction shaft is orthogonal to the optical axis 36$j$ of the projection lens 36. Thus, even when the inclination angle of the lens fixing plate is changed, a distance between the base plate and the lens fixing plate does not change on the optical axis 36$j$ of the projection lens. Thus, with the lens alignment adjustment device, while the distance between the projection lens 36 and the optical device 4 on the optical axis is always maintained constant, the angle accuracy of the optical axis 36$j$ of the projection lens 36 with respect to the optical axis of the optical device 4 can be suitably corrected.

In the present invention, only the first restriction shaft being orthogonal to the optical axis 36$j$ of the projection lens 30 may be provided between the base plate and the lens fixing plate. It is also possible to provide a second restriction shaft which is orthogonal to both the optical axis and the first restriction shaft. With such a configuration, the angle accuracy between the optical axis of the optical device 4 and the optical axis 36$j$ of the projection lens 36 can be corrected more precisely.

Thus, in the following, description is made of an example in which both the first restriction shaft and the second restriction shaft are provided.

Figure 2:
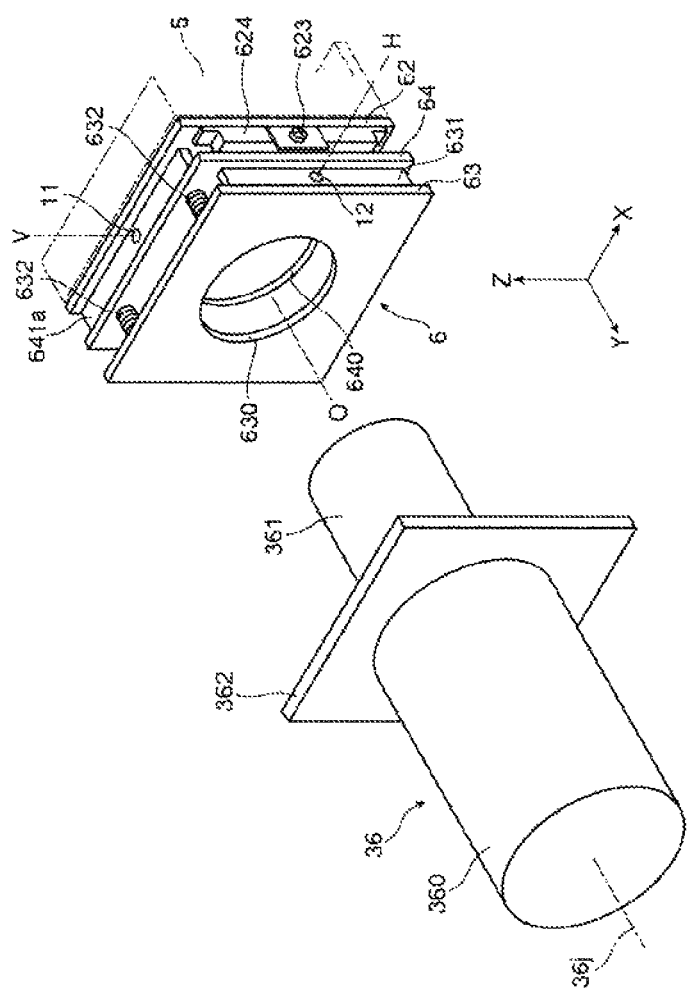
FIG. 2 is a perspective view for illustrating an example of a lens alignment adjustment device according to one embodiment of the present invention.

FIG. 2 is a schematic view for illustrating an example of the lens alignment adjustment device to which the present invention is applied. The lens alignment adjustment device 6 functions as a mounting portion configured to mount the projection lens 36 with respect to the optical unit 3, and is provided to the optical unit 3 for use. This lens alignment adjustment device 6 includes a base plate 62, a lens fixing plate 63, and an intermediate plate 64. The lens fixing plate 63 receives the projection lens 36 fixed thereto, and an inclination angle with respect to the base plate 62 is freely adjustable. The intermediate plate 64 is interposed between the base plate 62 and the lens fixing plate 63. All of the base plate 62, the lens fixing plate 63, and the intermediate plate 64 have a substantially rectangular shape as seen in the emission direction of the light fins from the projection lens 36 described later.

The base plate 62 is retained on the optical component housing 38 of the optical unit 3 through intermediation of the lens shift adjustment device 5 indicated by the two-dot chain line in FIG. 2. The lens shift adjustment device 5 is capable of freely moving the base plate 62 in the right-and-left direction and the up-and-down direction which are orthogonal to each other. The lens shift adjustment device 5 moves the optical axis 36$j$ of the projection lens 36 mounted to the lens fixing plate 63 with respect to an optical axis O of the optical device 4 in the right-and-left direction and/or the up-and-down direction without changing inclination, to thereby cause an image projected through the projection lens 36 to move in the right-and-left direction and/or the up-and-down direction.

The projection lens 36 includes a front portion 360 having a cylindrical shape, a rear portion 361 having a diameter smaller than a diameter of the front portion 360, and a flange portion 362 provided between the front portion 360 and the rear portion 361. The lens fixing plate 63, the intermediate plate 64, and the base plate 62 have center opening portions 630, 640, and 620, respectively, and the rear portion 361 is inserted into the center opening portions 630, 640, and 620 from the lens fixing plate 63 side. The light flux emitted from the optical device 4 enters the projection lens 36 through the rear portion 361.

The projection lens 36 is retained on the lens fixing plate 63 by a mount mechanism (not shown). In this occasion, with the action of the mount mechanism, the flange portion 362 is brought into close contact with the lens fixing plate 63, and the projection lens 36 is retained with the lens fixing plate 63 as a reference.

Meanwhile, the intermediate plate 64 is coupled to the base plate 62 through intermediation of the first center pin 11 serving as the first restriction shaft, and is arranged so as to be rockable with respect to the base plate 62 about the first center pin 11. The first center pin 11 is arranged on an axis V which is orthogonal to the optical axis 36$j$ of the projection lens 36 retained on the lens fixing plate 63 in a predetermined posture. The axis V matches with the Z direction. Therefore, the intermediate plate 64 rocks about the first center pin 11 so that the inclination angle with respect to the base plate 62 in the right-and-left direction (plus-and-minus X direction in FIG. 2) can be freely changed.

Further, the intermediate plate 64 is coupled to the lens fixing plate 63 through intermediation of the second center pin 12 serving as the second restriction shaft, and is arranged so as to be rockable with respect to the lens fixing plate 63 about the second center pin 12. The second center pin 12 is arranged on an axis H which is orthogonal to the optical axis 36$j$ of the projection lens 36 retained on the lens fixing plate 63 in a predetermined posture. The axis H matches with the X direction. Therefore, the lens fixing plate 63 rocks about the second center pin 12 so that the inclination angle with respect to the intermediate plate 64 in the up-and-down direction (plus-and-minus Z direction in FIG. 2) can be freely changed.

Figure 3:
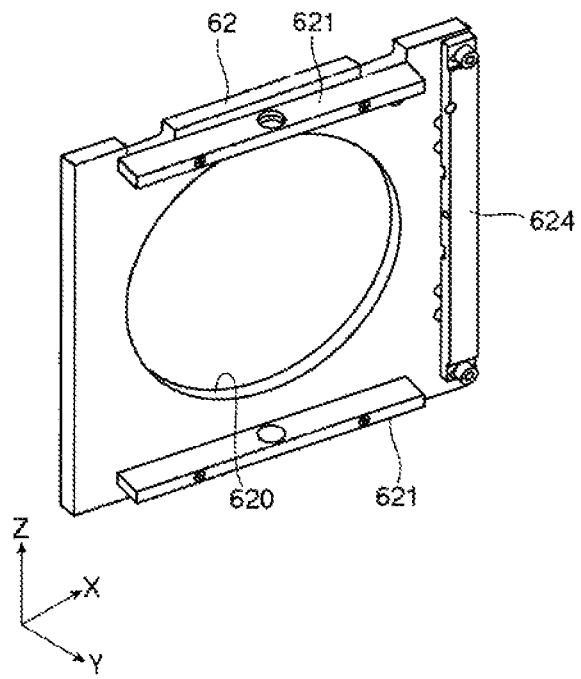
FIG. 3 is a perspective view for illustrating an example of a base plate.

FIG. 3 is a perspective view for illustrating one surface of the base plate 62 facing the intermediate plate 64. A pair of support members 621 are fixed to the base plate 62 on both sides of the base plate 62 across the center opening portion 620. Moreover, also on one surface of the intermediate plate 64 facing the base plate 62, a pair of support members 641$a$ (see FIG. 2) are fixed on both sides across the center opening portion 640. The support members 641$a$ of the intermediate plate 64 overlap the support members 621 of the base plate 62 on outer sides, and the first center pin 11 penetrates through the support members 621 of the base plate 62 and the support members 641$a$ of the intermediate plate 64 to rockably couple the base plate 62 and the intermediate plate 64 to each other. Moreover, a predetermined space is formed between the base plate 62 and each of the support members 641$a$ of the intermediate plate 64 and between the intermediate plate 64 and each of the support members 621 of the base plate 62. With such a space, rocking of the intermediate plate 64 about the first center pin 11 is not prevented.

Figure 4:
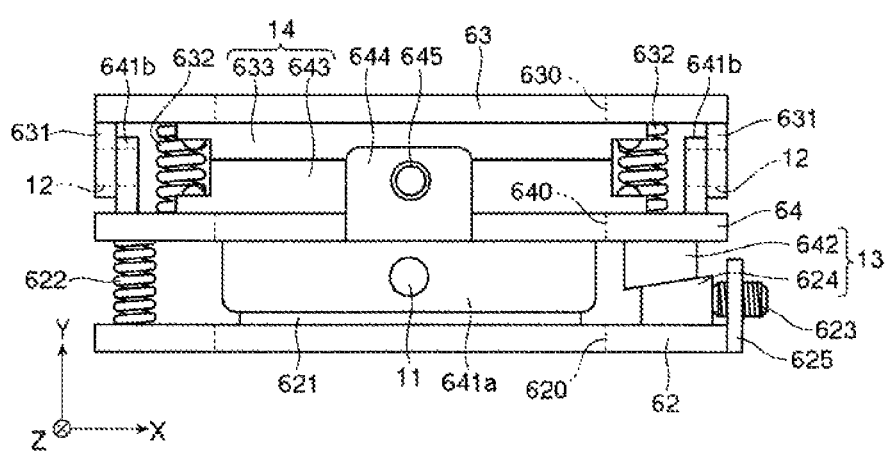
FIG. 4 is a side view for illustrating a structure among three components including the base plate, an intermediate plate, and a lens fixing plate.

FIG. 4 is an illustration of the lens alignment adjustment device 6 as observed in the plus Z direction from a lower side. A pair of support members 631 are fixed to the lens fixing plate 63 on both sides of the lens fixing plate 63 across the center opening portion 630. Moreover, also on one surface of the intermediate plate 64 facing the lens fixing plate 63, a pair of support members 641$b$ are fixed on both sides across the center opening portion 640. The support members 631 of the lens fixing plate 63 overlap the support members 641$b$ of the intermediate plate 64 on outer sides, and the second center pin 12 penetrates through the support members 631 of the lens fixing plate 63 and the support members 641$b$ of the intermediate plate 64 to rockably couple the lens fixing plate 63 and the intermediate plate 64 to each other. Moreover, a predetermined space is formed between the intermediate plate 64 and each of the support members 631 of the lens fixing plate 63 and between the lens fixing plate 63 and each of the support members 641b of the intermediate plate 64. With such a space, rocking of the lens fixing plate 63 about the second center pin 12 is not prevented.

Thus, the inclination angle of the intermediate plate 64 in the right-and-left direction is changeable with respect to the base plate 62 retained in the predetermined posture by the lens shift adjustment device 5. Moreover, the inclination angle of the lens fixing plate 63 in the up-and-down direction is changeable with respect to the intermediate plate 64. As a result, the inclination angle of the lens fixing plate 63 in the right-and-left direction and the up-and-down direction can be suitably changed with respect to the base plate 62. That is, with use of the above-mentioned mount mechanism to retain the projection lens 36 in a predetermined posture with respect to the lens fixing plate 63, the optical axis 36j of the projection lens 36 can be freely inclined with respect to the optical axis O of the optical device 4.

Next, description is made of first adjusting means for setting an inclination angle of the intermediate plate 64 with respect to the base plate 62. As illustrated in FIG. 4, the first adjusting means is arranged in a space defined between the base plate 62 and the intermediate plate 64, and includes coil springs 622 and a first interval changing member 13. The coil springs 622 serve as urging members. The first interval changing member 13 is configured to change a distance between the base plate 62 and the intermediate plate 64 against an urging force of the coil springs 622. Moreover, the first interval changing member 13 includes a cam plate 624 and a pressure receiving member 642. The cam plate 624 advances and retreats on the base plate 62 in accordance with a fastening amount of an adjustment screw 623. The pressure receiving member 642 is fixed to the intermediate plate 64, and is held in abutment against the cam plate 624.

In FIG. 3, the cam plate 624 mounted to the base plate 62 is illustrated. The cam plate 624 is formed to be elongated in the Z direction, and is fixed along a side of the base plate 62. An abutment surface of the cam plate 624 with respect to the pressure receiving member 642 is an inclined surface which is inclined by a predetermined angle with respect to the base plate 62, and a sectional shape of the cam plate 624 taken along an XY plane is a substantially wedge shape. A pair of long holes extending along the X direction are formed at both ends of the cam plate 624 in a longitudinal direction, and the cam plate is retained on the base plate 62 by two bolts penetrating through the pair of long holes. Thus, fixing positions of the cam plate 624 with respect to the base plate 62 is freely adjustable along the plus-and-minus X direction.

Moreover, as illustrated in FIG. 4, a screw mounting portion 625 is fixed to the base plate 62, and the adjustment screw 623 is threadably engaged with the screw mounting portion 625. The adjustment screw 623 has a distal end which is held in abutment against the cam plate 624. As the amount of fastening of the adjustment screw 623 with respect to the screw mounting portion 625 is increased, the cam plate 624 advances toward the first center pin 11.

Further, the pressure receiving member 642 has substantially the same shape as the cam plate 624, but is fixed to the intermediate plate 64 in an orientation reverse to the cam plate 624 so that inclined surfaces of the pressure receiving member 642 and the cam plate 624 are held in abutment against each other. Unlike the cam plate 624, the pressure receiving member 642 is fixed at a certain position of the intermediate plate 64.

The coil springs 622 are arranged between the base plate 62 and the intermediate plate 64, and are located on a side opposite to the first interval changing member 13 over the first center pin 11. Moreover, the coil springs 622 are arranged in a pair along the Z direction. Therefore, the intermediate plate 64 rotates around the first center pin 11 by an urging force of the coil springs 622. Thus, the cam plate 624 of the interval changing member 13 and the pressure receiving member 642 are always held in press-contact with each other.

With the first adjusting means having such a configuration, as the amount of fastening of the adjustment screw 623 with respect to the screw mounting portion 625 is increased, the cam plate 624 advances toward the first center pin 11, to thereby press the pressure receiving member 642 against the urging force of the coil springs 622. With this, the intermediate plate 64 is inclined with respect to the base plate 62 in a direction in which the coil springs 622 are compressed. Moreover, as the amount of fastening of the adjustment screw 623 with respect to the screw mounting portion 625 is reduced, the pressure receiving member 642 presses the cam plate 624 by the urging force of the coil springs 622, thereby causing the cam plate 624 to retreat in a direction opposite to the first center pin 11. With this, the intermediate plate 64 is inclined with respect to the base plate 62 in a direction in which the coil springs 622 are extended.

In order to effectively impart the urging force of the coil spring 622, it is preferred that the coil springs 622 be arranged at positions apart from the first center pin 11, in other words, in the vicinity of outer edge portions of the base plate 62 and the intermediate plate 64. Moreover, in order to improve operability by a user, it is preferred that the screw mounting portion 625 and the adjustment screw 623 be provided in the vicinity of the outer edge portion of the base plate 62.

Meanwhile, between the intermediate plate 64 and the lens fixing plate 63, there is provided second adjusting means having the same configuration as the first adjusting means. The second adjusting means is arranged in a space defined between the intermediate plate 64 and the lens fixing plate 63, and includes coil springs 632 and a second interval changing member 14. The coil springs 632 serve as urging members. The second interval changing member 14 is configured to change a distance between the intermediate plate 64 and the lens fixing plate 63 against an urging force of the coil spring 632. Moreover, the second interval changing member 14 includes a cam plate 643 and a pressure receiving member 633. The cam plate 643 advances and retreats on the intermediate plate 64 in accordance with a fastening amount of the adjustment screw 645. The pressure receiving member 633 is fixed to the lens fixing plate 63, and is held in abutment against the cam plate 643. Further, the adjustment screw 645 is threadably engaged with the screw mounting portion 644 fixed to the intermediate plate.

With the second adjusting means having such a configuration, as the amount of fastening of the adjustment screw 645 with respect to the screw mounting portion 644 is increased, the cam plate 643 advances toward the second center pin 12, to thereby press the pressure receiving member 633 against the urging force of the coil springs 632. With this, the lens fixing plate 63 is inclined with respect to the intermediate plate 64 in a direction in which the coil springs 632 are compressed. Moreover, as the amount of fastening of the adjustment screw 645 with respect to the screw mounting portion 644 is reduced, the pressure receiving member 633 presses the cam plate 643 by the urging force of the coil spring 632, thereby causing the cam plate 643 to retreat in a direction opposite to the second center pin 12. With this, the lens fixing plate 63 is inclined with respect to the intermediate plate 64 in a direction in which the coil springs 632 are extended.

The coil springs 632 are arranged on the plus Z direction side as illustrated in FIG. 2. This is because of the following reason. That is, when the coil spring 632 is arranged in the minus Z direction, a load caused by own weight of the projection lens 36 is applied. Thus, even when the amount of fastening of the adjustment screw 645 with respect to the screw mounting portion 644 is reduced, the lens fixing plate 63 is less liable to be inclined with respect to the intermediate plate 64 in the direction in which the coil spring 632 is extended. In other words, through the arrangement of the coil spring 632 on the plus Z direction side, swinging of the lens fixing plate 63 with respect to the intermediate plate 64 can be smoothly performed.

That is, in the lens alignment adjustment device 6, through changes in amount of thread engagement of the respective adjustment screws 623 and 645 of the first adjusting means provided between the base plate 62 and the intermediate plate 64 and the second adjusting means provided between the intermediate plate 64 and the lens fixing plate 63, the inclination angle of the intermediate plate 64 with respect to the base plate 62 in the right-and-left direction and the inclination angle of the lens fixing plate 63 with respect to the intermediate plate 64 in the up-and-down direction can be suitably set. As a result, the inclination of the optical axis 36j of the projection lens 36 with respect to the optical axis O of the optical device 4 can be freely adjusted. Moreover, the lens alignment adjustment device 6 may have a configuration in which the arrangement of the first center pin 11 and the arrangement of the second center pin 12, which are illustrated in FIG. 2 to FIG. 4, are switched. In other words, a similar effect can be obtained by adjusting the inclination of the optical axis 36j of the projection lens 36 with respect to the optical axis O of the optical device 4 in the up-and-down direction through use of the second adjusting means provided between the base plate 62 and the intermediate plate 64 and adjusting the inclination in the right-and-left direction through use of the first adjusting means provided between the intermediate plate 64 and the lens fixing plate 63.

As can be understood from FIG. 2 to FIG. 4, on the surface of the base plate 62 opposed to the intermediate plate 64, there are arranged the pair of support members 621 and the cam plate 624 along the side of the base plate 62. Moreover, on the surface of the lens fixing plate 63 opposed to the intermediate plate 64, there are arranged the pair of support members 631 and the pressure receiving member 633 along the side of the lens fixing plate 63. Further, the pair of support members 641a and the pressure receiving member 642 are arranged on the surface of the intermediate plate 64 opposed to the base plate 62, and the pair of support members 641b and the cam plate 643 are arranged on the surface of the intermediate plate 64 opposed to the lens fixing plate.

In order to correctly retain the heavy projection lens 36 by the lens alignment adjustment device 6, it is important to eliminate deformation of the base plate 62, the intermediate plate 64, and the lens fixing plate 63, which are rockably coupled to one another. However, it is required that a plate thickness of each plate be increased, and increase in weight of the device cannot be avoided. In the example illustrated in FIG. 2 to FIG. 4, for each side of the base plate 62, the intermediate plate 64, and the lens fixing plate 63 having a substantially rectangular shape, there are arranged the support members 621, 641a, 641b, and 631, the cam plates 624 and 643, and the pressure receiving members 642 and 633, and those members are each formed into a rod shape having a substantially rectangular or substantially wedge-shaped cross section. Therefore, the support members 621, 641a, 641b, and 631, the cam plates 624 and 643, and the pressure receiving members 642 and 633 are fixed to the base plate 62, the intermediate plate 64, and the lens fixing plate 63 so that those members function as reinforcing members for the plates 62, 63, and 64.

Thus, even when the plate thickness of each of the base plate 62, the intermediate plate 64, and the lens fixing plate 63 is set small, deformation of those plates 62, 63, and 64 can be suppressed with use of the rigidities of the support members 621, 641a, 641b, and 631, the cam plates 624 and 643, and the pressure receiving members 642 and 633. In such a manner, the lens alignment adjustment device 6 is reduced in weight.

The support members 621, 641a, 641b, and 631 and the pressure receiving members 642 and 633 may be formed integrally with corresponding ones of the base plate 62, the intermediate plate 64, and the lens fixing plate 63 by a manufacturing method such as die casting.

With the lens alignment adjustment device 6 having the configuration described above, the following effects can be attained.

The base plate 62 is retained on the optical component housing 38 of the projector 1 through intermediation of the lens shift adjustment device 5. The inclination angle of the intermediate plate 64 in the right-and-left direction with respect to the base plate 62 is freely adjustable. Moreover, the inclination angle of the lens fixing plate 63 in the up-and-down direction with respect to the intermediate plate 64 is freely adjustable. As a result, the inclination angles in the right-and-left direction and the up-and-down direction of the projection lens 36 retained on the lens fixing plate 63 can be freely adjusted with respect to the optical component housing 38.

In this case, the base plate 62 and the intermediate plate 64 are rockably coupled to each other through intermediation of the first center pin 11 orthogonal to the optical axis 36j of the projection lens 36. Even when the inclination angle of the intermediate plate 64 with respect to the base plate 62 is changed, a distance between the plates 62 and 64 does not change on the optical axis 36j. Moreover, the intermediate plate 64 and the lens fixing plate 63 are rockably coupled to each other through intermediation of the second center pin 12 orthogonal to the optical axis 36j of the projection lens 36 and to the first center pin 11. Even when the inclination angle of the lens fixing plate 63 with respect to the intermediate plate 64 is changed, a distance between the plates 63 and 64 does not change on the optical axis 36j.

Thus, with the lens alignment adjustment device 6, even when the inclination angles of the optical axis 36j of the projection lens 36 in two directions including the right-and-left direction and the up-and-down direction are changed, the angle accuracy of the projection lens 36 can be suitably corrected while maintaining a constant path length of projected light having been modulated by the optical device 4 of the projector 1 on the optical axis 36j.

The invention claimed is:

1. A lens alignment adjustment device, which is provided to a projector to retain a projection lens, and is capable of adjusting inclination of an optical axis of the projection lens with respect to the projector, the lens alignment adjustment device comprising:

a base plate which is retained in a predetermined posture with respect to the projector;

a lens fixing plate to which the projection lens is fixed, the lens fixing plate being rockably coupled to the base plate through intermediation of a first restriction shaft orthogonal to an optical axis of the projection lens; and a cam configured to set an inclination angle of the lens fixing plate with respect to the base plate about the first restriction shaft.

2. The lens alignment adjustment device according to claim 1, wherein the base plate and the lens fixing plate are formed into a substantially rectangular shape having opening portions at respective centers to which a part of the projection lens is loosely fitted, and wherein a support base is configured to retain the first restriction shaft is provided on a surrounding side of the base plate.

3. The lens alignment adjustment device according to claim 1, further comprising a spring arranged in a compressed state between the base plate and the lens fixing plate, wherein the cam is further configured to change a distance between the base plate and the lens fixing plate against an urging force of the spring, and wherein the spring and the cam are arranged with the first restriction shaft placed therebetween.

4. The lens alignment adjustment device according to claim 3, wherein the cam is a cam plate configured to change an interval between the base plate and the lens fixing plate in accordance with an amount of thread engagement of an adjustment screw, and wherein the cam plate is provided in parallel with the first restriction shaft along a side of the base plate or the lens fixing plate.

5. The lens alignment adjustment device according to claim 1, wherein an intermediate plate is provided between the base plate and the lens fixing plate, wherein the intermediate plate is rockably coupled to the base plate through intermediation of the first restriction shaft, wherein the lens fixing plate is rockably coupled to the intermediate plate through intermediation of a second restriction shaft orthogonal to the first restriction shaft as seen along the optical axis of the projection lens and in a light emission direction of the projection lens, and wherein a second cam is configured to set an inclination angle of the lens fixing plate with respect to the base plate about the second restriction shaft.

6. The projector, comprising:

a light source device;

a light modulation device configured to modulate and emit light emitted from the light source device;

a projection lens configured to project the light modulated by the light modulation device; and the lens alignment adjustment device of claim 1, which is configured to retain the projection lens.

7. The projector, comprising:

a light source device;

a light modulation device configured to modulate and emit light emitted from the light source device;

a projection lens configured to project the light modulated by the light modulation device; and the lens alignment adjustment device of claim 2, which is configured to retain the projection lens.

8. The projector, comprising:

a light source device;

a light modulation device configured to modulate and emit light emitted from the light source device;

a projection lens configured to project the light modulated by the light modulation device; and the lens alignment adjustment device of claim 3, which is configured to retain the projection lens.

9. The projector, comprising:

a light source device;

a light modulation device configured to modulate and emit light emitted from the light source device;

a projection lens configured to project the light modulated by the light modulation device; and the lens alignment adjustment device of claim 4, which is configured to retain the projection lens.

10. The projector, comprising:

a light source device;

a light modulation device configured to modulate and emit light emitted from the light source device;

a projection lens configured to project the light modulated by the light modulation device; and the lens alignment adjustment device of claim 5, which is configured to retain the projection lens.

* * * * *